S. C. CAUSEY.
ANIMAL TRAP.
APPLICATION FILED FEB. 18, 1916.
1,190,859. Patented July 11, 1916.
2 SHEETS—SHEET 1.
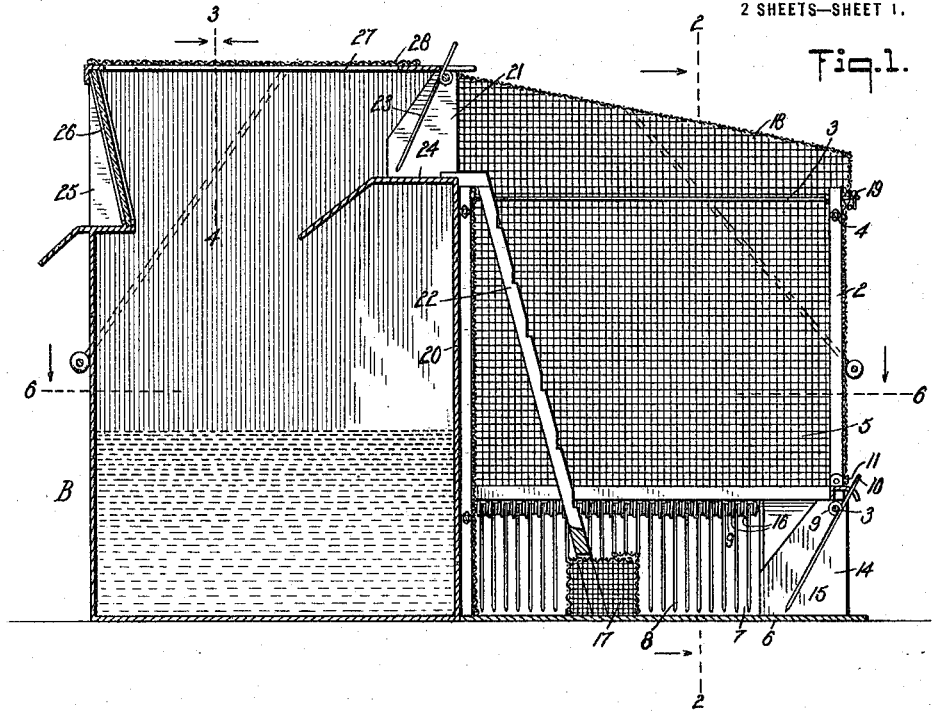
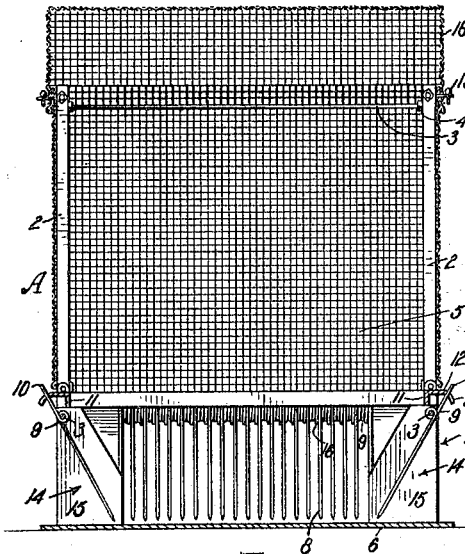
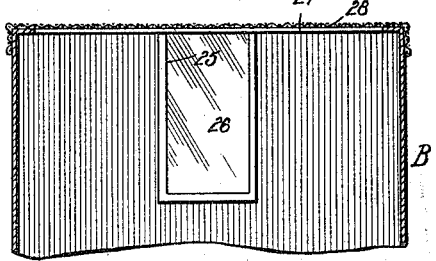

S. C. CAUSEY.
ANIMAL TRAP.
APPLICATION FILED FEB. 18, 1916.

1,190,859.

Patented July 11, 1916.
2 SHEETS—SHEET 2.

WITNESSES

INVENTOR
S. C. Causey
BY
ATTORNEYS

UNITED STATES PATENT OFFICE.

STEPHEN CABLE CAUSEY, OF SCHENECTADY, NEW YORK.

ANIMAL-TRAP.

1,190,859.  Specification of Letters Patent.  Patented July 11, 1916.

Application filed February 18, 1916. Serial No. 79,021.

*To all whom it may concern:*

Be it known that I, STEPHEN C. CAUSEY, a citizen of the United States, and a resident of Schenectady, in the county of Schenectady and State of New York, have invented a new and Improved Animal-Trap, of which the following is a full, clear, and exact description.

This invention relates to animal traps, and more particularly to traps of that type including two compartments, one for enticing and entrapping the rat or other animal, and the other for killing the same, as by drowning.

The invention has for its general objects to improve and simplify the construction and operation of apparatus of this character so as to be reliable and efficient in use, comparatively simple and inexpensive to manufacture, and so designed as to be easily emptied.

A more specific object of the invention is the provision of a trap which is always automatically set and so designed as to readily entice the animals, which after starting to enter the trap cannot withdraw and must proceed into the trap.

Another object of the invention is the provision of a simple, novel and effective means whereby the animal can pass from the entrance to the drowning compartment in an attempt to escape, whereby the entrance compartment will be kept free to insure a better enticing of other animals, the drowning compartment being in the form of a box or water-holding receptacle having a gate which opens inwardly and which has a glazed opening opposite the gate so as to induce the animal to enter in the hopes of finding an escape from the trap, but the box need not hold water if it is desired to catch the animals alive.

With such objects in view, and others which will appear as the description proceeds, the invention comprises various novel features of construction and arrangement of parts which will be set forth with particularity in the following description and claims appended hereto.

Figure 5:
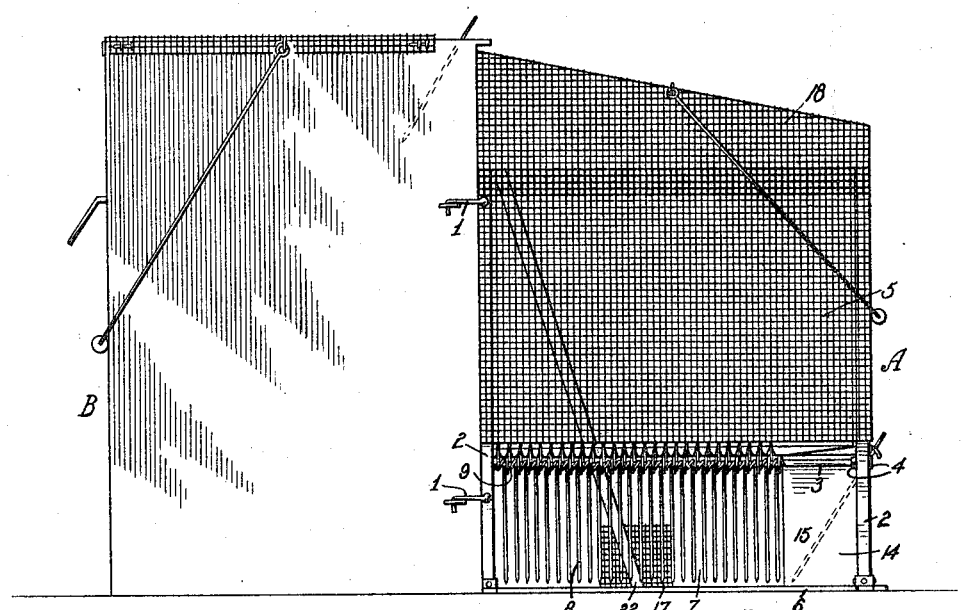
Figure 7:
Figure 8:
Figure 6:
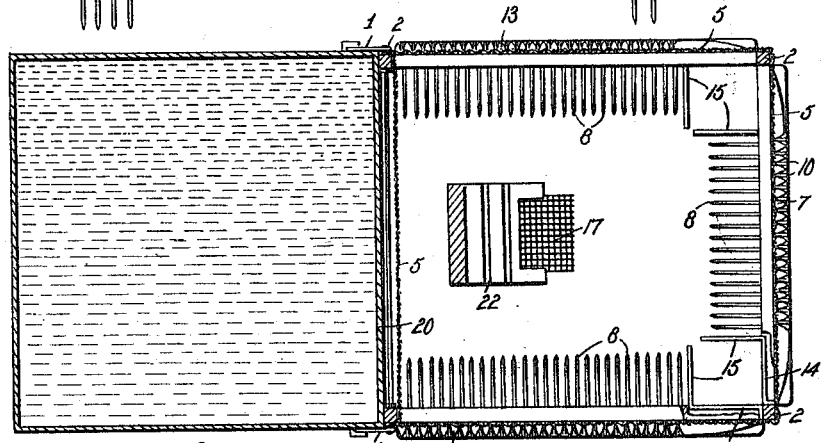

In the accompanying drawings, which illustrate one embodiment of the invention and wherein similar characters of reference indicate corresponding parts in all the views, Figure 1 is a vertical longitudinal section of the trap; Fig. 2 is a vertical section on the line 2—2, Fig. 1; Figs. 3 and 4 are sectional views on the line 3—4, Fig. 1, and looking to the left and right respectively; Fig. 5 is a side view of the trap; Fig. 6 is a horizontal section on the line 6—6, Fig. 1; Fig. 7 is a fragmentary view of the gate at the entrance of the drowning compartment; Fig. 8 is a fragmentary view of one of the entrance gates to the trap; and Fig. 9 is a perspective view of one of the stop bars for the entrance gate.

Referring to the drawings, A designates the entrance section of the trap, and B the drowning or holding section, the two being detachably connected by any suitable fastenings 1, as shown in Fig. 5.

The section A comprises a frame formed by corner uprights 2 and horizontal connecting rods 3 which pass through the uprights and have clamping nuts 4. The framework of the section A has four sides closed by wire netting 5 which has its lower edge spaced a few inches above the sheet metal bottom plate 6 that is fastened to the lower ends of the uprights 2, this being true on at least three sides, so that entrance openings 7 are provided for the rats or other animals to be entrapped. These entrance openings 7 are provided with gates formed of wire or other impaling members 8 that are disposed side by side in spaced relation and pivoted at their upper ends on the connecting or bolt rods 3. These gate members 7 are inclined inwardly from the pivot rods 3 and are so disposed that an animal can freely enter by pushing under the members 8, lifting only those with which the animal comes in contact. After the animal's head or shoulders pass in under the members 8, the latter having pointed lower ends will prevent the animal from working out backwardly, since the points of the members will pierce the body and impale the animal, if a further attempt is made to escape, the consequence being that the animal will continue to enter and the raised members 8 will drop to normal position and thus entrap the animal. The members 8 are formed with a single coil 9 at their upper ends so as to constitute an eye through which the rod 3 extends, and projecting upwardly from the eyes 9 are extensions or fingers 10 that are adapted to engage stop bars 11 that may be of angle-shaped cross-section, as shown in Figs. 1 and 9, and fastened at their ends to the uprights 2. The outwardly extending flanges 12 of these bars 11 have notches or serrations 13 into which the members 10 extend, whereby the gate members 8 are maintained in inclined position, as shown in Figs. 1 and 2. In other words, the center of each gate member is to one side of the pivotal axis 3 on which the members swing, and the tendency of the members is to swing outwardly to an approximately vertical position, but the stop bars 11 prevent this. In other words, the gate members can freely swing inwardly but are restrained from swinging outwardly.

As there are gate members 8 on three sides it is necessary to provide fillers 14 at the outer corners of the section A at a point below the netting 5, these fillers being in the form of angularly bent metal members 15 fastened to the uprights 2. The adjacent members 8 are separated by washers 16, as shown in Fig. 8, whereby the members are limited to a swinging movement in one plane. To entice the animals into the section A, a bait holder 17 is arranged on the bottom plate 6 and access to the bait holder is provided by making the upper portion 18 as a lid detachably held by suitable fastening means 19.

The section B is shown as a sheet metal box and may contain water for drowning the animals. The wall 20 of the box B has an opening 21 adjacent the top and the animals can pass to the same by means of a ladder or equivalent device 22 in the section A. The opening 21 appears as an avenue of escape for the entrapped animal in the section A, and reaching the opening the animal encounters a gate formed of pivoted members 23, similar to the gate members 8. These gate members 23 swing inwardly so that the animal can pass to the platform 24 which extends into the box B and overhangs the water therein. Opposite the entrance opening 21 is an opening 25 closed by a transparent glass 26 whereby an apparent avenue of escape for the animal is provided, and the animal jumping from the platform to the opening 25 strikes the glass and is thrown backwardly into the water. The top of the box B has an opening 27 normally closed by a wire door or cover 28 which may be wire netting, and it is through this opening that the animal can be removed from the trap.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A trap comprising a structure having an entrance opening, a rod extending across the opening, a plurality of impaling gate members pivotally mounted on the rod and adapted to swing open in an upward direction and to drop downwardly to closed position behind an animal entering the trap by raising the members, and a stop element mounted adjacent the rod and with which the members normally engage to hold the same in inclined position and preventing the members from swinging outwardly, said stop element being in the form of an angle bar having a downwardly bent flange having as many recesses as there are members for the upper ends of the members to normally engage therein.

2. A trap comprising a structure having an entrance opening, a smooth, straight rod extending across the opening, a plurality of wire gate members having pivot eyes through which the rod extends and formed with extensions projecting upwardly above the eyes, washers disposed between the members of the rod for holding the members in spaced relation and a stop element fixed above the rod and with which the extensions of the members engage for holding the members inclined downwardly and inwardly and preventing the members from swinging outwardly, whereby the animal can enter the trap by pushing under and raising the members, the lower ends of the members being sharpened.

In testimony whereof I have signed my name to this specification in the presence of two subscribing witnesses.

STEPHEN CABLE CAUSEY.

Witnesses:
ANNA M. SCHAAFF,
C. CASSIDY.

Copies of this patent may be obtained for five cents each, by addressing the "Commissioner of Patents, Washington, D. C."